US011136757B2

(12) United States Patent
Yuan et al.

(10) Patent No.: US 11,136,757 B2
(45) Date of Patent: Oct. 5, 2021

(54) GYPSUM PANELS, SYSTEMS, AND METHODS

(71) Applicant: Georgia-Pacific Gypsum LLC, Atlanta, GA (US)

(72) Inventors: Yongan Yuan, Westfield, IN (US); Stuart Brandon Gilley, Atlanta, GA (US); Bryan Wiltzius, Atlanta, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 118 days.

(21) Appl. No.: 16/557,144

(22) Filed: Aug. 30, 2019

(65) Prior Publication Data

US 2020/0102744 A1 Apr. 2, 2020

Related U.S. Application Data

(60) Provisional application No. 62/738,518, filed on Sep. 28, 2018.

(51) Int. Cl.
*E04C 2/04* (2006.01)
*B32B 13/08* (2006.01)
*C04B 28/14* (2006.01)
*C04B 111/28* (2006.01)
*C04B 111/00* (2006.01)

(52) U.S. Cl.
CPC .............. *E04C 2/043* (2013.01); *B32B 13/08* (2013.01); *C04B 28/14* (2013.01); *B32B 2607/00* (2013.01); *C04B 2111/0062* (2013.01); *C04B 2111/28* (2013.01)

(58) Field of Classification Search
CPC ................. C04B 28/14; C04B 2111/28; C04B 2111/0062; B32B 13/08; B32B 2607/00; E04C 2/043
See application file for complete search history.

(56) References Cited

U.S. PATENT DOCUMENTS

| 3,376,147 A | 4/1968 | Dean |
| 5,871,857 A | 2/1999 | Alhamad |
| 5,922,447 A | 7/1999 | Baig |
| 6,054,088 A | 4/2000 | Alhamad |
| 6,391,958 B1 | 5/2002 | Luongo |
| 10,427,979 B2 * | 10/2019 | Harrison ................. C04B 14/18 |
| 2002/0017222 A1 | 2/2002 | Luongo |
| 2008/0087366 A1 * | 4/2008 | Yu ........................... E04F 13/04 156/39 |
| 2017/0190147 A1 * | 7/2017 | Brooks ................... B32B 13/08 |

FOREIGN PATENT DOCUMENTS

| AU | 2014201626 A1 | 4/2014 |
| WO | 0028809 A1 | 5/2000 |
| WO | 2017115317 A1 | 7/2017 |
| WO | 2017160907 A1 | 9/2017 |

OTHER PUBLICATIONS

International Preliminary Report on Patentability for PCT Application No. PCT/US2019/049075, dated Mar. 23, 2021, 7 pages.
International Search Report and Written Opinion for PCT Application No. PCT/US2019/049075, dated Oct. 12, 2019, 10 pages.

* cited by examiner

*Primary Examiner* — Anthony J Green

(57) ABSTRACT

Gypsum panels and methods of making the same are provided. A gypsum panel includes a gypsum core containing set gypsum and unexpanded perlite ore, wherein the unexpanded perlite ore is present in the gypsum core in an amount greater than any other component, other than the gypsum.

18 Claims, 13 Drawing Sheets

GYPSUM PANELS, SYSTEMS, AND METHODS

CROSS-REFERENCE TO RELATED APPLICATIONS

This application claims priority benefit of U.S. Provisional Patent Application No. 62/738,518, filed on Sep. 28, 2019, the disclosure of which is incorporated by reference herein in its entirety.

BACKGROUND

The present invention relates generally to the field of panels for use in building construction, and more particularly to gypsum panels and methods of making gypsum panels.

Typical building panels, such as interior building panels, building sheathing, or roof panels, include a core material, such as gypsum, and a mat facer, such as a paper facer or fiberglass mat facer. During manufacturing, the gypsum core material is traditionally applied as a slurry to a surface of the mat facer and allowed to set, such that the mat facer and gypsum core are adhered at the interface. Conventionally, such panels are heavy—with weights above 2000 lbs/msf—and lighter panels may suffer from performance issues and/or require costly ingredients to achieve certain properties (e.g., physical properties and fire resistance).

Accordingly, it would be desirable to provide lightweight panels having improved physical properties and fire resistance.

SUMMARY

In one aspect, a gypsum panel is provided, including a gypsum core containing set gypsum and unexpanded perlite ore, wherein the unexpanded perlite ore is present in the gypsum core in an amount greater than any other component, other than the gypsum.

In another aspect, a method of making a gypsum panel is provided, including forming a first gypsum slurry by combining stucco, water, and unexpanded perlite ore; and setting the first gypsum slurry to form at least part of a core of the gypsum panel, wherein the unexpanded perlite ore is present in the gypsum core in an amount greater than any other component, other than the gypsum.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Figure 1:
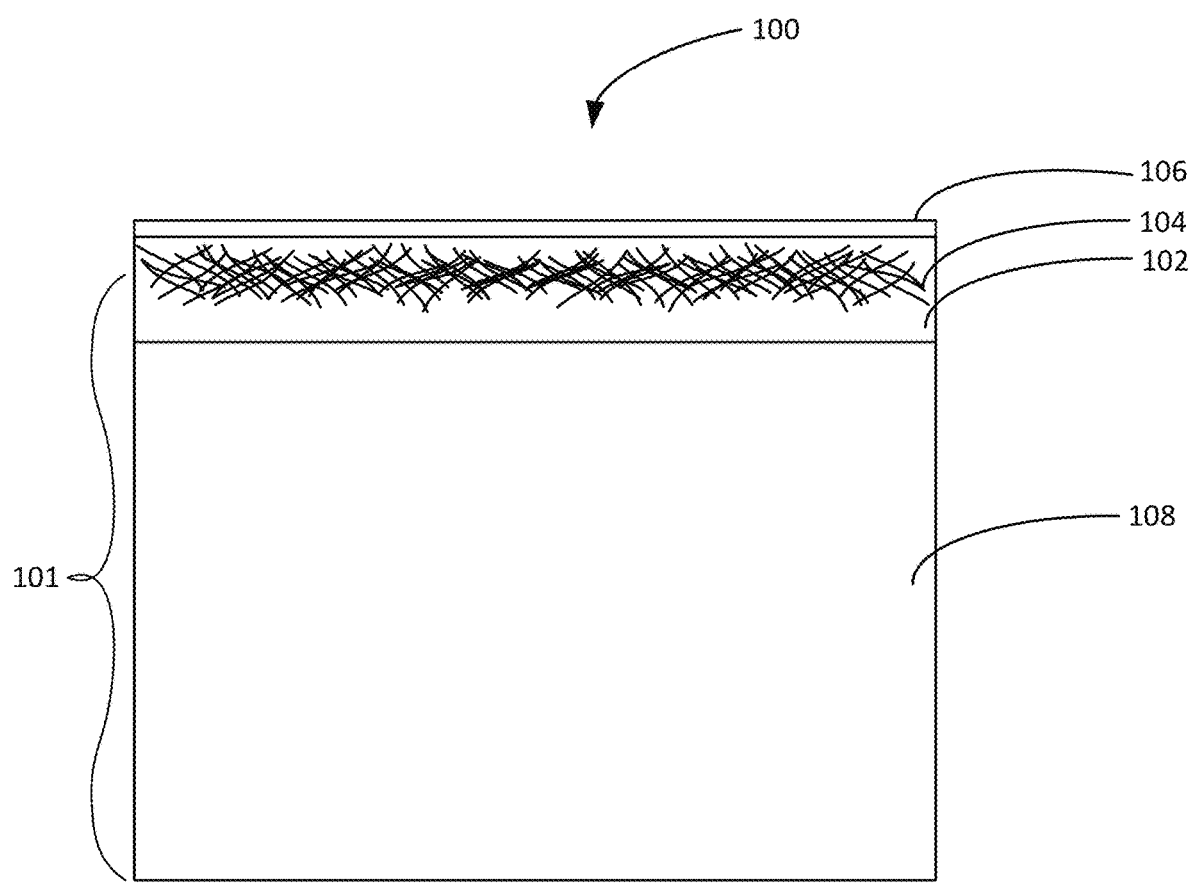
FIG. 1 is a cross-sectional view of a gypsum panel.

Gypsum panels and systems of panels, and methods for their manufacture, are provided herein. The panels may be lightweight panels and display improved physical properties as well as fire resistance. In particular, these panels contain unexpanded perlite ore (or unexpanded pozzolanic ore, as will be discussed in greater detail below) as the second most prevalent component of the panel core, after the gypsum. It has been discovered that such panels may reduce the amount of costly ingredients needed to achieve fire resistance ratings in lightweight panels having the desired physical properties. In particular, the gypsum panels described herein may beneficially provide an alternative to the use of vermiculite in gypsum panels. In other embodiments, the unexpanded perlite ore may be used in combination with vermiculite and/or clays to achieve the desired properties.

Generally, this disclosure relates to the use of unexpanded perlite ore in gypsum panels to achieve a desired lightweight and fire resistant panel. However, it has been discovered that unexpanded pozzolanic ore generally displays an average chemical composition similar or identical to that of unexpanded perlite ore. (See Examples and FIG. 10.) Thus, as used herein, the term "unexpanded perlite ore" is meant to encompass unexpanded perlite ore and other materials, such as unexpanded pozzolanic ore that display an average chemical compositional analysis within or similar to the average range of unexpanded perlite ore, as shown in the Examples. In particular, materials having a chemical composition containing in the range of plus or minus 5% of each particular chemical component (e.g., each oxide compound) of a representative unexpanded perlite ore sample, should be considered to fall within the scope of the term "unexpanded perlite ore" for these purposes.

Generally, this disclosure is intended to encompass various forms of gypsum panel products, such as paper-faced fire-rated panels, sheathing panels, roofing panels, and other glass mat and paper faced gypsum panels. While certain embodiments may be described with reference to the term "fire-rated" "sheathing" or "roofing", it should be understood that the panels described herein are not meant to be limited to these particular uses, and that the features of panels described as fire-rated, sheathing or roofing panels may be encompassed by other types of gypsum panels.

Gypsum panels or boards may contain a set gypsum core sandwiched between two mats, none, one, or both of which may be coated. The mat coating may be a substantially continuous barrier coating. As used herein, the term "substantially continuous barrier coating" refers to a coating material that is substantially uninterrupted over the surface of the mat.

During manufacturing, a gypsum slurry may be deposited on the uncoated surface of a facer material, such as a paper sheet or fiberglass mat (which may be pre-coated offline or online), and set to form a gypsum core of the panel. The gypsum slurry may adhere to a paper facing material or penetrate some portion of the thickness of the fiberglass mat, and provide a mechanical bond for the panel. The gypsum slurry may be provided in one or more layers, having the same or different compositions, including one or more slate coat layers. As used herein, the term "slate coat" refers to a gypsum slurry having a higher wet density than the remainder of the gypsum slurry that forms the gypsum core.

While this disclosure is generally directed to gypsum panels, it should be understood that other cementitious panel core materials are also intended to fall within the scope of the present disclosure. For example, cementitious panel core materials such as those including magnesium oxide or aluminosilicate may be substituted for the gypsum of the embodiments disclosed herein, to achieve similar results.

Moreover, while embodiments of the present disclosure are described generally with reference to paper facing materials or fiberglass mats, it should be understood that other mat materials, including other fibrous mat materials, may also be used in the present panels. In certain embodiments, the nonwoven fibrous mat is formed of fiber material that is capable of forming a strong bond with the material of the building panel core through a mechanical-like interlocking between the interstices of the fibrous mat and portions of the core material. Examples of fiber materials for use in the nonwoven mats include mineral-type materials such as glass fibers, synthetic resin fibers, and mixtures or blends thereof. Both chopped strands and continuous strands may be used.

Various embodiments of this disclosure are for purposes of illustration only. Parameters of different steps, components, and features of the embodiments are described separately, but may be combined consistently with this description of claims, to enable other embodiments as well to be understood by those skilled in the art. Various terms used herein are likewise defined in the description, which follows.

Methods

Methods of making gypsum panels containing unexpanded perlite ore are provided. In particular, these methods may include forming a first gypsum slurry by combining stucco, water, and unexpanded perlite ore, and setting the first gypsum slurry to form at least part of a core of the gypsum panel, wherein the unexpanded perlite ore is present in the gypsum core in an amount greater than any other component, other than the gypsum. That is, the unexpanded perlite ore may be present in an amount that is greater than all other ingredients in the gypsum core, other than the gypsum.

For example, the unexpanded perlite ore may be present in the gypsum core in an amount of about 1 lb/msf to about 300 lb/msf, for a gypsum panel having a thickness of about ¼ inch to about 1 inch. For example, the unexpanded perlite ore may be present in the gypsum core in an amount of about 1 lb/msf to about 200 lb/msf, for a gypsum panel having a thickness of about ¼ inch to about 1 inch. For example, the unexpanded perlite ore may be present in the gypsum core in an amount of about 10 lb/msf to about 300 lb/msf, such as in an amount of about 10 lb/msf to about 200 lb/msf, about 50 lb/msf to about 150 lb/msf, about 70 lb/msf to about 140 lb/msf, or about 75 lb/msf to about 125 lb/msf, for a gypsum panel having a thickness of about ¼ inch to about 1 inch. As used herein, "msf" refers to 1,000 square feet.

The panel thickness ranges given herein are meant to be exemplary, and it should be understood that panels in accordance with the present disclosure may have any suitable thickness. Where amounts of materials present within the panel are defined in terms of lb/msf over a certain thickness of panel, it should be understood that the amount of the relevant material described to be present per volume of the panel may be applied to various other panel thicknesses. In certain embodiments, the panels have a thickness from about ¼ inch to about 1 inch. For example, the panels may have a thickness of from about ½ inch to about ⅝ inch, such as from about ½ inch to about ¾, as generally described.

As used herein the term "about" is used to refer to plus or minus 2 percent of the relevant numeral that it describes. These methods may be used to produce gypsum panels having any of the features, or combinations of features, described herein, such as improved physical properties, such as strength properties, and fire resistance.

In certain embodiments, the unexpanded perlite ore may have a particle size that is effective to achieve the desired physical properties of the gypsum board. For example, the unexpanded perlite ore may have an average particle size of about ASTM Sieve No. 400 (0.037 mm) to about ASTM Sieve No. 5 (4 mm). For example, the unexpanded perlite ore may have an average particle size of from about Sieve No. 200 to about Sieve No. 20, from about Sieve No. 150 to about Sieve No. 40, from about Sieve No. 110 to about Sieve No. 60, or from about Sieve No. 140 to about Sieve No. 70. It has been discovered that unexpanded perlite ore having a broad range of particle size may be effective to achieve fire resistant properties, as a substitute for or in combination with vermiculite, in gypsum boards.

In certain embodiments, the gypsum slurries of the present disclosure further contain one or more ingredients or additives to achieve the desired board properties. Various additives are discussed herein and may be used in any combination. In particular, suitable additives may include, but are not limited to, one or more of starch, fiberglass, dispersants, ball mill accelerators, retarders, potash, polyphosphates, and polymer binders.

For example, a suitable polyphosphate may be contained in the gypsum slurry. For example, the polyphosphate may be sodium trimetaphosphate (STMP), sodium hexametaphosphate (SHMP), ammonium polyphosphate (APP). Other suitable phosphate salts may also be used and include other metaphosphate, polyphosphate, and pyrophosphate salts, such as ammonium trimetaphosphate, potassium trimetaphosphate, lithium trimetaphosphate, calcium trimetaphosphate, sodium calcium trimetaphosphate, aluminum trimetaphosphate; ammonium, lithium, or potassium hexametaphosphates; sodium tripolyphosphate, potassium tripolyphosphate, sodium and potassium tripolyphosphate; calcium pyrophosphate, tetrapotassium pyrophosphate, and/or tetrasodium pyrophosphate.

For example, a suitable starch may be contained in the gypsum slurry in an amount effective to bind the gypsum to the unexpanded perlite. For example, the starch may act as a binder for binding the gypsum to the unexpanded perlite, or the gypsum to an unexpanded perlite and vermiculite mixture, if used. The starch may be any suitable starch material known in the industry. In some embodiments, the starch is pregelatinized (precooked) starch or a combination of uncooked and pregelatinized starch. For example, the starch may be present in the gypsum core in an amount of about 1 lb/msf to about 70 lb/msf, for a gypsum panel having a thickness of about ¼ inch to about 1 inch, such as from about 1 lb/msf to about 50 lb/msf.

For example, a suitable polymer binder, such as an organic polymer binder may be contained in the gypsum slurry. Suitable polymer binders may include polymeric emulsions and resins, e.g., acrylics, siloxane, silicone, styrene-butadiene copolymers, polyethylene-vinyl acetate, polyvinyl alcohol, polyvinyl chloride (PVC), polyurethane, urea-formaldehyde resin, phenolics resin, polyvinyl butyryl, styrene-acrylic copolymers, styrene-vinyl-acrylic copolymers, styrene-maleic anhydride copolymers. In some embodiments, the binders may include UV curable monomers and polymers (e.g., epoxy acrylate, urethane acrylate, polyester acrylate). For example, on a dry basis, the polymer binder content may be between 1 lb/msf to 50 lb/msf, for a gypsum panel having a thickness of about ¼ inch to 1 inch.

Figure 2:
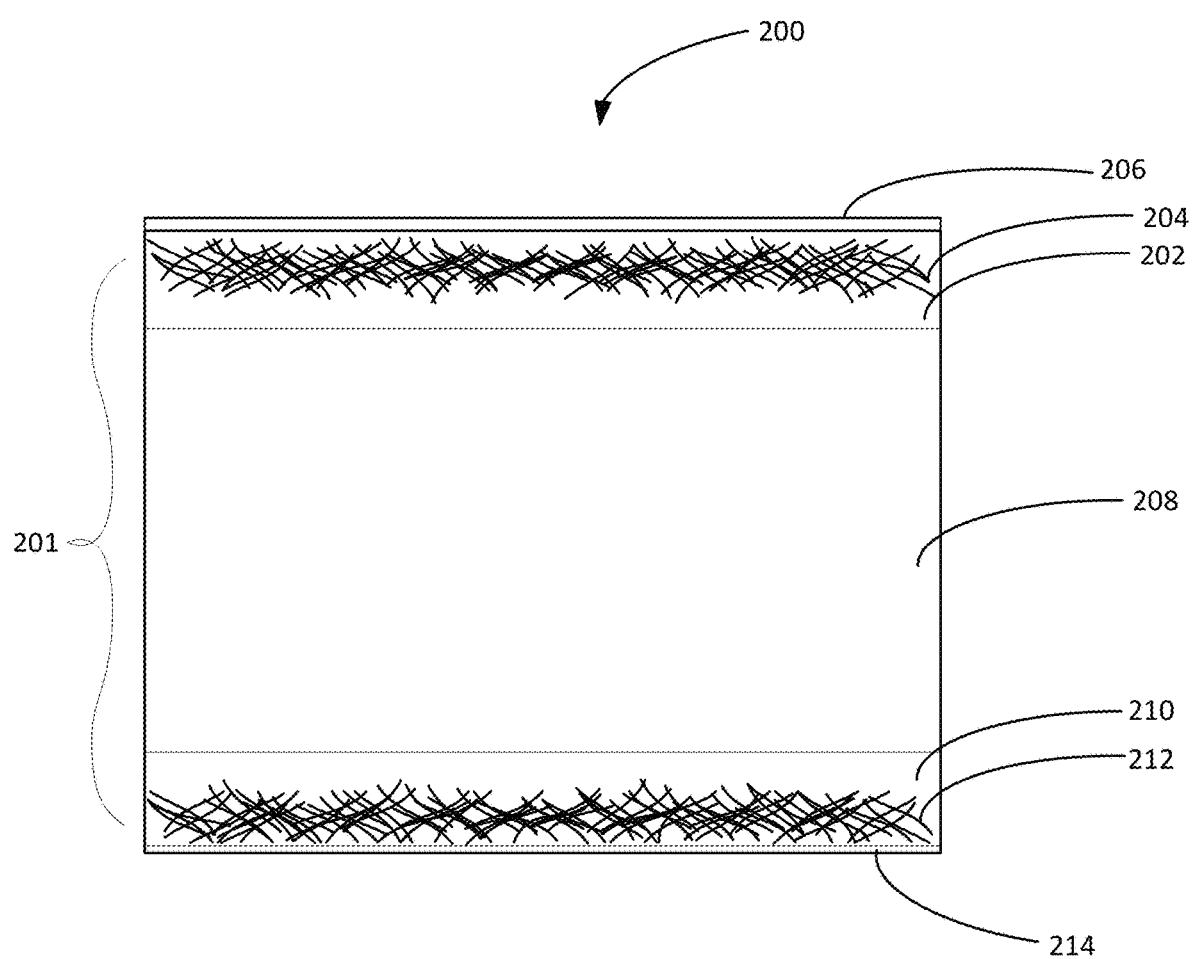
FIG. 2 is a cross-sectional view of a gypsum panel
Figure 3:
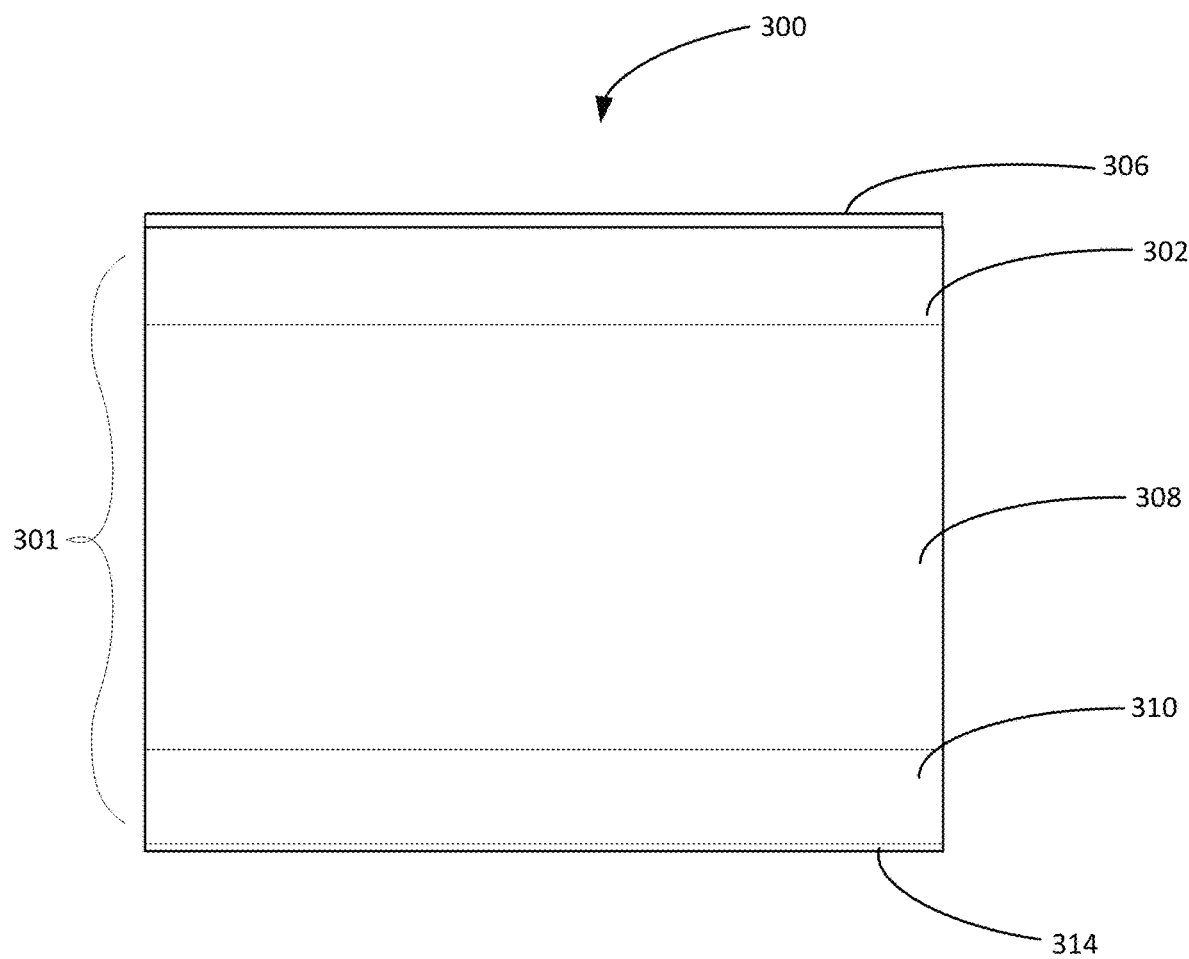
FIG. 3 is a cross-sectional view of a gypsum panel.
Figure 4:
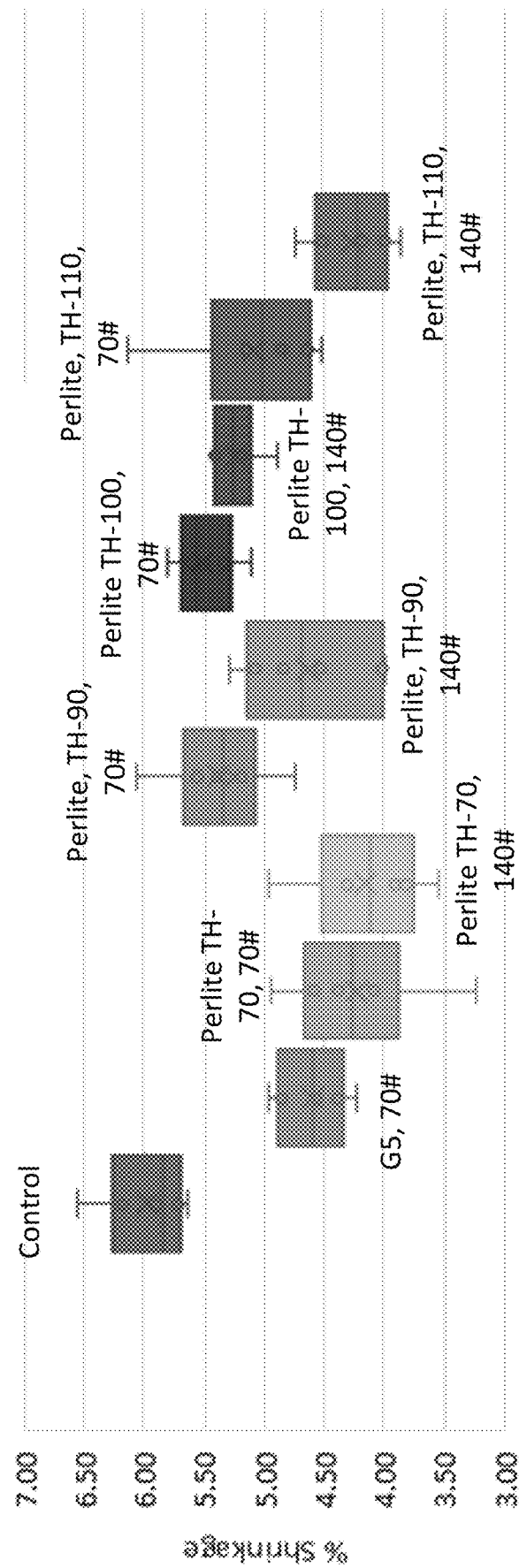
FIG. 4 is a graph showing the % shrinkage of various experimental samples subjected to a high temperature shrinkage test, according to the Examples.
Figure 5:
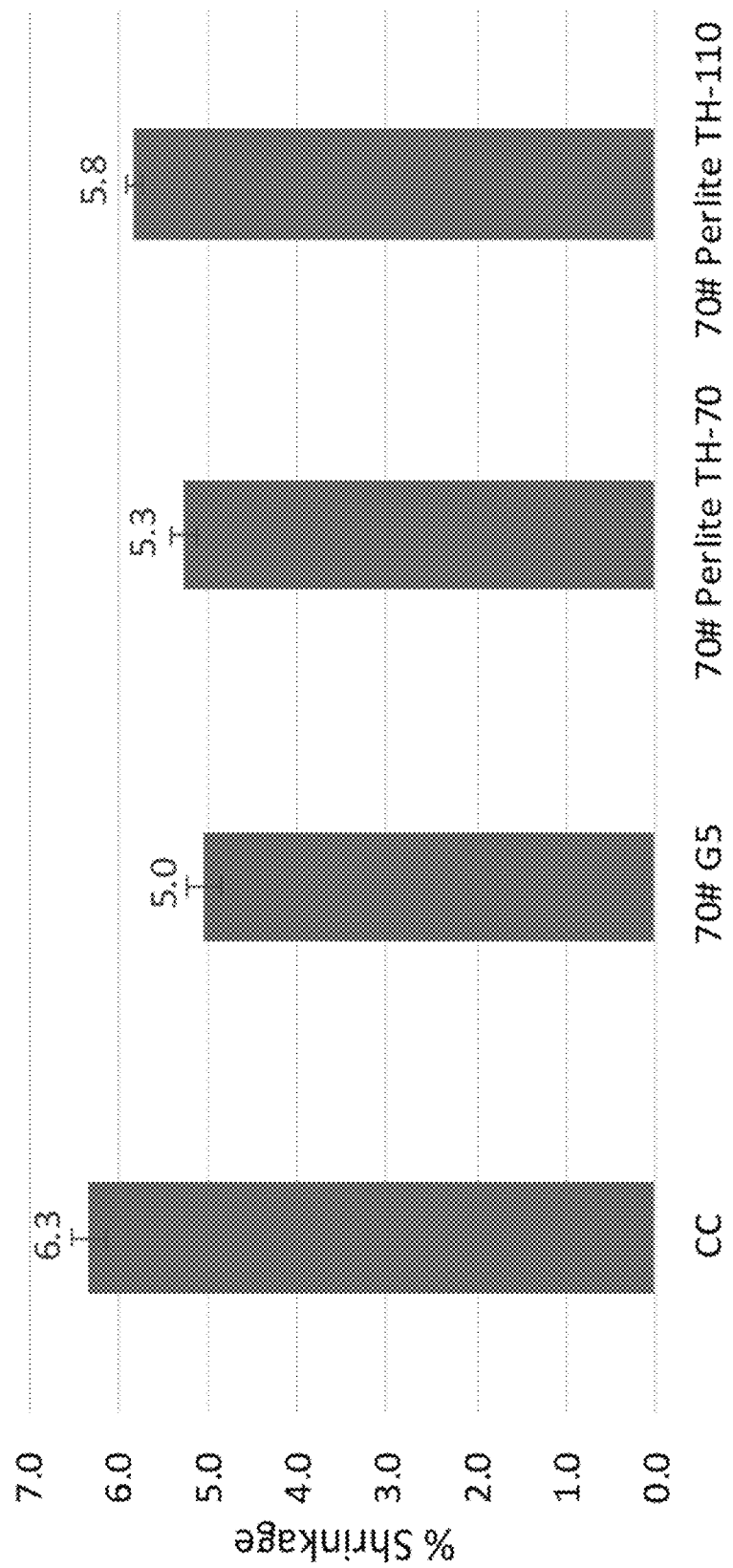
FIG. 5 is a graph showing the % shrinkage of various experimental samples subjected to a high temperature core integrity test, according to the Examples.

In certain embodiments, the gypsum core includes multiple layers that are sequentially applied to a facing material, and allowed to set either sequentially or simultaneously. In such embodiments, the first gypsum slurry may form any one or more of these layers. In other embodiments, the gypsum core includes a single layer formed by the first gypsum slurry. In some embodiments, a second facing material may be deposited onto a surface of the final gypsum slurry layer (or the sole gypsum slurry layer), to form a dual mat-faced gypsum panel, as shown in FIGS. 2 and 3. In certain embodiments, the first gypsum slurry (or each of the outermost gypsum slurry layers) is deposited in an amount of from about 5 percent to about 20 percent, by weight, of the gypsum core. The gypsum slurry or multiple layers thereof may be deposited on the facer material by any suitable means, such as roll coating.

In certain embodiments, the first gypsum slurry (or other gypsum slurry layers that form the core) contains one or more additional agents to enhance its performance, such as, but not limited to, wetting agents, fillers, accelerators, set retarders, foaming agents, polyphosphates, and dispersing agents. Various example uses of such further additives will now be described.

In certain embodiments, a wetting agent is selected from a group consisting of surfactants, superplasticisers, dispersants, agents containing surfactants, agents containing superplasticisers, agents containing dispersants, and combinations thereof. For example, the gypsum slurry or layer(s) may include wax, wax emulsions and co-emulsions, silicone, siloxane, siliconate, or a combination thereof. For example, suitable superplasticisers include Melflux 2651 F and 4930F, commercially available from BASF Corporation. In certain embodiments, the wetting agent is a surfactant having a boiling point of 200° C. or lower. In some embodiments, the surfactant has a boiling point of 150° C. or lower. In some embodiments, the surfactant has a boiling point of 110° C. or lower. For example, the surfactant may be a multifunctional agent based on acetylenic chemistry or an ethoxylated low-foam agent.

In certain embodiments, a surfactant is present in the relevant gypsum slurry in an amount of about 0.01 percent to about 1 percent, by weight. In certain embodiments, the surfactant is present in the relevant gypsum slurry in an amount of about 0.01 percent to about 0.5 percent, by weight. In some embodiments, the surfactant is present in the relevant gypsum slurry in an amount of about 0.05 percent to about 0.2 percent, by weight.

Suitable surfactants and other wetting agents may be selected from non-ionic, anionic, cationic, or zwitterionic compounds, such as alkyl sulfates, ammonium lauryl sulfate, sodium lauryl sulfate, alkyl-ether sulfates, sodium laureth sulfate, sodium myreth sulfate, docusates, dioctyl sodium sulfosuccinate, perfluorooctanesulfonate, perfluorobutanesulfonate, linear alkylbenzene sulfonates, alkyl-aryl ether phosphates, alkyl ether phosphate, alkyl carboxylates, sodium stearate, sodium lauroyl sarcosinate, carboxylate-based fluorosurfactants, perfluorononanoate, perfluorooctanoate, amines, octenidine dihydrochloride, alkyltrimethylammonium salts, cetyl trimethylammonium bromide, cetyl trimethylammonium chloride, cetylpyridinium chloride, benzalkonium chloride, benzethonium chloride, 5-Bromo-5-nitro-1,3-dioxane, dimethyldioctadecylammonium chloride, cetrimonium bromide, dioctadecyldimethylammonium bromide, sultaines, cocamidopropyl hydroxysultaine, betaines, cocamidopropyl betaine, phospholipids phosphatidylserine, phosphatidylethanolamine, phosphatidylcholine, sphingomyelins, fatty alcohols, cetyl alcohol, stearyl alcohol, cetostearyl alcohol, stearyl alcohols, oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, polyethoxylated tallow amine, and block copolymers of polyethylene glycol and polypropylene glycol. For example, suitable surfactants include Surfynol 61, commercially available from Air Products and Chemicals, Inc. (Allentown, Pa.).

In certain embodiments, the gypsum slurry (or one or more layers thereof) is substantially free of foam, honeycomb, excess water, and micelle formations. As used herein, the term "substantially free" refers to the slurry containing lower than an amount of these materials that would materially affect the performance of the panel. That is, these materials are not present in the slurry in an amount that would result in the formation of pathways for liquid water in the glass mat of a set panel, when under pressure.

In certain embodiments, the panel core slurry (or layers thereof) may be deposited on a horizontally oriented moving web of facer material, such as pre-coated fibrous mat or paper facing material. A second coated or uncoated web of facer material may be deposited onto the surface of the panel core slurry opposite the first web of facer material, e.g., a non-coated surface of the second web of facer material contacts the panel core slurry. In some embodiments, a moving web of a facer material may be placed on the upper free surface of the aqueous panel core slurry. Thus, the panel core material may be sandwiched between two facer materials, none, one or both having a coating. In certain embodiments, allowing the panel core material and/or coating to set includes curing, drying, such as in an oven or by another suitable drying mechanism, or allowing the material(s) to set at room temperature (i.e., to self-harden).

A barrier coating may be applied to one or both (in embodiments having two) facer surfaces, prior to or after drying of the facers. In some embodiments, the glass mats are pre-coated when they are associated with the panel core slurry. In some embodiments, depositing a barrier coating onto the second surface of the first coated glass mat occurs after setting the first gypsum slurry to form at least a portion of a gypsum core. In some embodiments, the gypsum core coated with the barrier coating is cured, dried, such as in an oven or by another suitable drying mechanism, or the materials are allowed to set at room temperature. In some embodiment, infrared heating is used to flash off water and dry the barrier coating.

Suitable coating materials (i.e., the precursor to the dried mat coating) may contain at least one suitable polymer binder. Suitable polymer binders may be selected from polymeric emulsions and resins, e.g. acrylics, siloxane, silicone, styrene-butadiene copolymers, polyethylene-vinyl acetate, polyvinyl alcohol, polyvinyl chloride (PVC), polyurethane, urea-formaldehyde resin, phenolics resin, polyvinyl butyryl, styrene-acrylic copolymers, styrene-vinyl-acrylic copolymers, styrene-maleic anhydride copolymers. In some embodiments, the polymer binder is an acrylic latex or a polystyrene latex. In some embodiments, the polymer binder is hydrophobic. In certain embodiments, the binder includes UV curable monomers and/or polymers (e.g. epoxy acrylate, urethane acrylate, polyester acrylate). In certain embodiments, the mat coating contains the polymer binder in an amount of from about 5 percent to about 75 percent, by weight, on a dry basis.

Examples of suitable polymer binders that may be used in the continuous barrier coatings described herein include SNAP 720, commercially available from Arkema Coating Resins, which is a structured nano-particle acrylic polymer containing 100% acrylic latex and 49% solids by weight, with a 0.08 micron particle size; SNAP 728, commercially available from Arkema Coating Resins, which is a structured nano-acrylic polymer containing 100% acrylic latex and 49% solids by weight, with a 0.1 micron particle size; and NEOCAR 820, commercially available from Arkema Coating Reins, which is a hydrophobic modified acrylic latex containing 45% solids by weight, with a 0.07 micron particle size.

In certain embodiments, the mat coating also contains one or more inorganic fillers. For example, the inorganic filler may be calcium carbonate or another suitable filler known in the industry. In certain embodiments, the filler is an inorganic mineral filler, such as ground limestone (calcium carbonate), clay, mica, gypsum (calcium sulfate dihydrate), aluminum trihydrate (ATH), antimony oxide, sodium-potassium alumina silicates, pyrophyllite, microcrystalline silica, and talc (magnesium silicate). In certain embodiments, the filler may inherently contain a naturally occurring inorganic adhesive binder. For example, the filler may be limestone containing quicklime (CaO), clay containing calcium silicate, sand containing calcium silicate, aluminum trihydrate containing aluminum hydroxide, cementitious fly ash, or magnesium oxide containing either the sulfate or chloride of magnesium, or both. In certain embodiments, the filler may include an inorganic adhesive binder as a constituent, cure by hydration, and act as a flame suppressant. For example, the filler may be aluminum trihydrate (ATH), calcium sulfate (gypsum), and the oxychloride and oxysulfate of magnesium. For example, fillers may include MINEX 7, commercially available from the Cary Company (Addison, Ill.); IMSIL A-10, commercially available from the Cary Company; and TALCRON MP 44-26, commercially available from Specialty Minerals Inc. (Dillon, Mont.). The filler may be in a particulate form. For example, the filler may have a particle size such that at least 95% of the particles pass through a 100 mesh wire screen.

In certain embodiments, the precursor material that forms the mat coating also contains water. For example, the coating material may contain the polymer binder in an amount of from about 35 percent to about 80 percent, by weight, and water in an amount of from about 20 percent to about 30 percent, by weight. In embodiments containing the filler, the continuous barrier coating material may also contain an inorganic filler in an amount of from about 35 percent to about 80 percent, by weight. In some embodiments, the polymer binder and the inorganic filler are present in amounts of within 5 percent, by weight, of each other. For example, the polymer binder and filler may be present in a ratio of approximately 1:1.

In some embodiments, the mat coating also includes water and/or other optional ingredients such as colorants (e.g., dyes or pigments), transfer agents, thickeners or rheological control agents, surfactants, ammonia compositions, defoamers, dispersants, biocides, UV absorbers, and preservatives. Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.). Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.). Defoamers may include multi-hydrophobe blend defoamers and other defoamers known to those of ordinary skill in the art. For example, defoamers may include FOAMASTER SA-3, commercially available from BASF Corporation. Ammonia compositions may include ammonium hydroxide, for example, AQUA AMMONIA 26 BE, commercially available from Tanner Industries, Inc. (Southampton, Pa.). Biocides may include broad-spectrum microbicides that prohibit bacteria and fungi growth, antimicrobials such as those based on the active diiodomethyl-p-tolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives. UV absorbers may include encapsulated hydroxyphenyl-triazine compositions and other compounds known to those of ordinary skill in the art, for example, TINUVIN 477DW, commercially available from BASF Corporation. Transfer agents such as polyvinyl alcohol (PVA) and other compounds known to those of ordinary skill in the art may also be included in the coating composition.

In certain embodiments, the gypsum panels described herein are "lightweight" panels, having a core density of no more than about 40 pcf (lb/ft$^3$). For example, in some embodiments, the panel has a panel weight of from about 800 to about 2500 lb/msf, such as from about 800 to about 2000 lb/msf, such as from about 800 to about 1600 lb/msf, such as from about 800 to about 1300 lb/msf, for a gypsum panel having a thickness of about ¼ inch to about 1 inch.

These panels may be relatively lightweight while also providing a high fire resistance level, but without the use of, or using a lower relative amount of, vermiculite. For example, the boards described herein may display similar or better thermal shrinkage and high temperature core integrity results than comparative boards containing vermiculite, such as measured according to ASTM C1795-15: Standard Test Methods for High-Temperature Characterization of Gypsum Boards and Panels. Further, the combination of pregelatinized starch and unexpanded perlite ore was discovered to provide enhanced physical board properties, in addition to the fire resistant properties. For example, the panels containing unexpanded perlite ore were discovered to display less sag, under fire resistance testing, than a comparable board made with vermiculite.

Methods of constructing a building sheathing system are also provided herein, including installing at least two gypsum panels having an interface therebetween, and applying a seaming component at the interface between the at least two of the gypsum panels. Gypsum panels used in these methods may have any of the features, properties, or combinations of features and/or properties, described herein. Sheathing systems constructed by these methods may have any of the features, properties, or combinations or features and/or properties, described herein. The seaming component may be any suitable seaming component as described herein.

Panels and Systems

Gypsum panels having improved fire resistance and/or physical properties may be made by any of the methods described herein. For example, a gypsum panel may include a gypsum core containing set gypsum and unexpanded perlite ore, wherein the unexpanded perlite ore is present in the gypsum core in an amount greater than any other component, other than the gypsum. As discussed above, the panels may have a thickness from about ¼ inch to about 1 inch. For example, the panels may have a thickness of from about ½ inch to about ⅝ inch.

In certain embodiments, as shown in FIG. 3, a gypsum panel 300 includes one or two paper facer materials 306, 314 that are associated with the gypsum core 301. The second facer 314 is present on a face of the gypsum core 301 opposite the first facer 306. In some embodiments, one or both of the facer materials 306, 314 may have a coating disposed on one or both surfaces thereof, prior to combination with the gypsum slurry, or, for external surface coatings, after combination with the gypsum slurry. In some embodiments, the gypsum core 301 includes three gypsum layers 302, 308, 310. One or both of the gypsum layers 302, 310 that are in contact with the facers 306, 314 may be a slate coat layer, as discussed herein.

In some embodiments, as shown in FIG. 1, the gypsum of the gypsum core 101 penetrates a remaining portion of the first fibrous mat 104 such that voids in the mat 104 are substantially eliminated. For example, in one embodiment, the first mat 104 has a mat coating 106 on a surface opposite the gypsum core 101, the mat coating 106 penetrating a portion of the first mat 104, to define the remaining portion of the first mat 104. That is, gypsum of the gypsum core 101 may penetrate a remaining fibrous portion of the first fibrous mat 104 such that voids in the first mat 104 are substantially eliminated. As used herein the phrase "such that voids in the mat are substantially eliminated" and similar phrases, refer to the gypsum slurry, and thus the set gypsum, of the gypsum core filling all or nearly all of the interstitial volume of the fibrous mat that is not filled by the coating material. In certain embodiments, the gypsum of the gypsum core fills at least 95 percent of the available interstitial volume of the mat. In some embodiments, the gypsum core fills at least 98 percent of the available interstitial volume of the mat. In further embodiments, the gypsum core fills at least 99 percent of the available interstitial volume of the mat.

By maximizing gypsum slurry penetration into the side of the mat receiving gypsum, the movement of water under the mat coating within the glass mat of the finished panel when exposed to bulk water head pressures may be substantially and adequately reduced, without significantly altering the water vapor transmission rate (i.e., the ability to dry) of the finished panel. Thus, the gypsum panels disclosed herein may further display one or more improved water-resistive barrier properties.

In certain embodiments, the mat 104 is a nonwoven fiberglass mat. For example, the glass fibers may have an average diameter of from about 10 to about 17 microns and an average length of from about ¼ inch to about 1 inch. For example, the glass fibers may have an average diameter of 13 microns (i.e., K fibers) and an average length of ¾ inch. In certain embodiments, the nonwoven fiberglass mats have a basis weight of from about 1.5 pounds to about 3.5 pounds per 100 square feet of the mat. The mats may each have a thickness of from about 20 mils to about 35 mils. The fibers may be bonded together to form a unitary mat structure by a suitable adhesive. For example, the adhesive may be a urea-formaldehyde resin adhesive, optionally modified with a thermoplastic extender or cross-linker, such as an acrylic cross-linker, or an acrylate adhesive resin. In other embodiments, the mat facer may be a suitable paper facer material.

In certain embodiments, as shown in FIG. 1, the gypsum core 101 includes two or more gypsum layers 102, 108. For example, the gypsum core may include various gypsum layers having different compositions. In some embodiments, the first gypsum layer 102 that is in contact with the mat 104 (i.e., the layer that forms an interface with the coating material 106 and at least partially penetrates the first mat) is a slate coat layer. In some embodiments, the first gypsum layer 102 is present in an amount from about 5 percent to about 20 percent, by weight, of the gypsum core 101. In certain embodiments, the slate coat layer is formed from the first gypsum slurry described herein. In other embodiments, the entire panel core is formed from the first gypsum slurry. The first gypsum slurry may form one or more of these layers.

In certain embodiments, as shown in FIG. 2, a gypsum panel 200 includes two fibrous mats 204, 212 (which could alternatively be paper facers) that are associated with the gypsum core 201. The second mat 212 is present on a face of the gypsum core 201 opposite the first mat 204. In some embodiments, only the first mat 204 has a mat coating 206 on a surface thereof. In other embodiments, both mats 204, 212 have a coating 206, 214 on a surface thereof opposite the gypsum core 201. In some embodiments, the gypsum core 201 includes three gypsum layers 202, 208, 210. One or both of the gypsum layers 202, 210 that are in contact with the mats 204, 212 may be a slate coat layer.

In certain embodiments, one or more layers of the gypsum core also includes reinforcing fibers, such as chopped fiberglass fibers or particles. In one embodiment, the gypsum core contains about 1 pound to about 20 pounds of reinforcing fibers per 1000 square feet of panel. For example, the gypsum core, or any layer(s) thereof, may include up to about 6 pounds of reinforcing fibers per 1000 square feet of panel. For example, the gypsum core, or a layer thereof, may include about 3 pounds of reinforcing fibers per 1000 square feet of panel. The reinforcing fibers may have a diameter between about 10 and about 17 microns and have a length between about 5 and about 18 millimeters.

In certain embodiments, as discussed above, the building panels described herein may display one or more improved performance characteristics such as fire resistance. Building sheathing systems are also provided herein, and include at least two of the improved water-resistive gypsum panels described herein, including any features, or combinations of features, of the panels described herein.

In certain embodiments, a building sheathing system includes at least two gypsum panels and a seaming component configured to provide a seam at an interface between at least two of the gypsum panels. In certain embodiments, the seaming component comprises tape or a bonding material. For example, the seaming component may be a tape including solvent acrylic adhesives, a tape having a polyethylene top layer with butyl rubber adhesive, a tape having an aluminum foil top layer with butyl rubber adhesive, a tape having an EPDM top layer with butyl rubber adhesive, a tape having a polyethylene top layer with rubberized asphalt adhesive, or a tape having an aluminum foil top layer with rubberized asphalt adhesive or rubberized asphalt adhesives modified with styrene butadiene styrene. For example, the seaming component may be a bonding material containing silyl terminated polyether, silyl modified polymers, silicones, synthetic stucco plasters and/or cement plasters, synthetic acrylics, sand filled acrylics, and/or joint sealing chemistries comprising solvent based acrylics, solvent based butyls, latex (water-based, including EVA, acrylic), polysulfides polyurethanes, and latexes (water-based, including EVA, acrylic).

Thus, the above-described enhanced panels may be installed with either a tape, liquid polymer, or other suitable material, to effectively treat areas of potential water and air intrusion, such as seams, door/window openings, penetrations, roof/wall interfaces, and wall/foundation interfaces.

Examples

Embodiments of the gypsum panels disclosed herein were constructed and tested, as described below.

First, ⅝ inch paper-faced gypsum board samples were prepared containing various amounts and particle sizes of unexpanded perlite ore. The samples were tested according to High Temperature Shrinkage, High Temperature Thermal Transmission, and High Temperature Core Cohesion Tests, as outlined in ASTM C1795-15: Standard Test Methods for High-Temperature Characterization of Gypsum Boards and Panels, as well as High Temperature Core Integrity Tests, which are used to characterize the fire retardant properties of a sample. The High Temperature Core Integrity Test involves heating conditioned sample boards in an oven for an hour to a pre-determined temperature, allowing the samples to cool, then visually assessing the damage to the panel core, measuring the width, height, and length of the sample at consistent points on the sample board, and weighing the samples. The % shrinkage is then determined for the width, height, and length measurements. The results are shown in FIGS. 4, 5, and 11-13. As can be seen, the coarsest unexpanded perlite sample (TH-70) displayed comparable shrinkage properties to G5 (vermiculite) at 70 #/msf dosage and performed better than the fine unexpanded perlite sample (TH-140) in both shrinkage and high temperature core integrity. Moreover, the unexpanded perlite samples displayed comparable or better thermal transmission and core cohesion properties than the vermiculite comparative samples.

Figure 6:
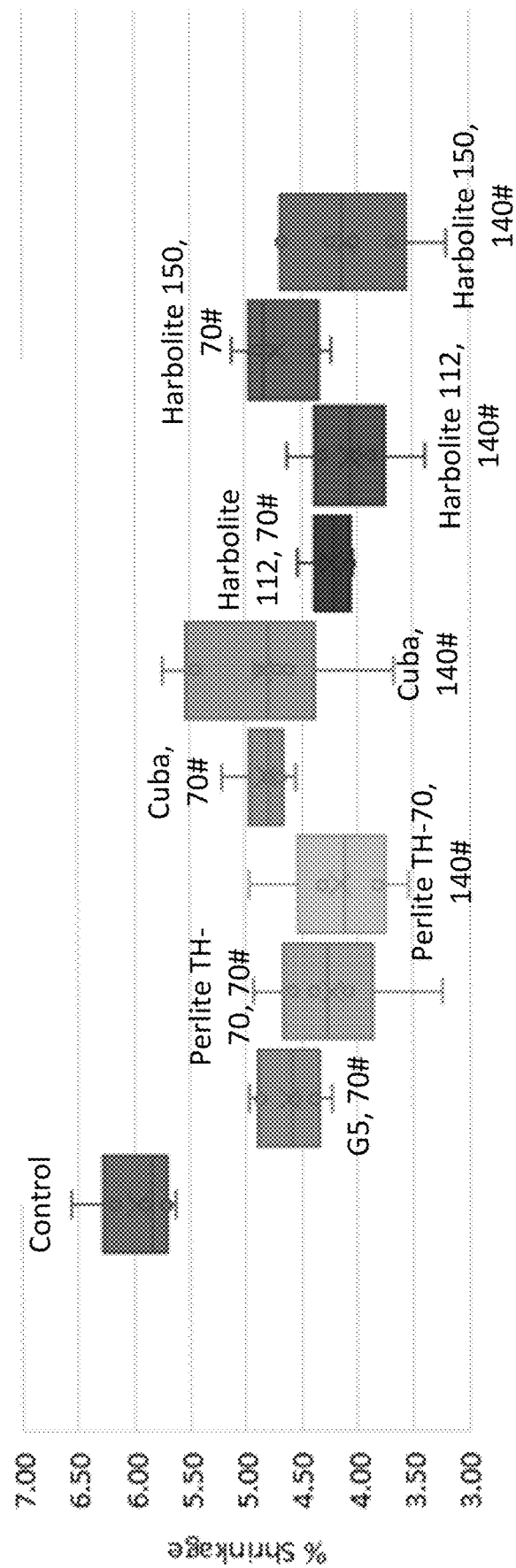
FIG. 6 is a graph showing the % shrinkage of various experimental samples subjected to a high temperature shrinkage test, according to the Examples.

Next, the properties of gypsum boards constructed using unexpanded perlite ore samples from various sources in various loading amounts were tested. The results are shown in FIG. 6. As can be seen, the source of the unexpanded perlite ore did not significantly affect the thermal shrinkage test results and the unexpanded perlite samples were generally comparable in performance to the samples containing vermiculite (G5) versus the control samples containing neither. Additionally, it was observed that the additional loading of unexpanded perlite ore (from 70 pounds/msf to 140 pounds/msf) did not significantly impact the thermal shrinkage.

Figure 7:
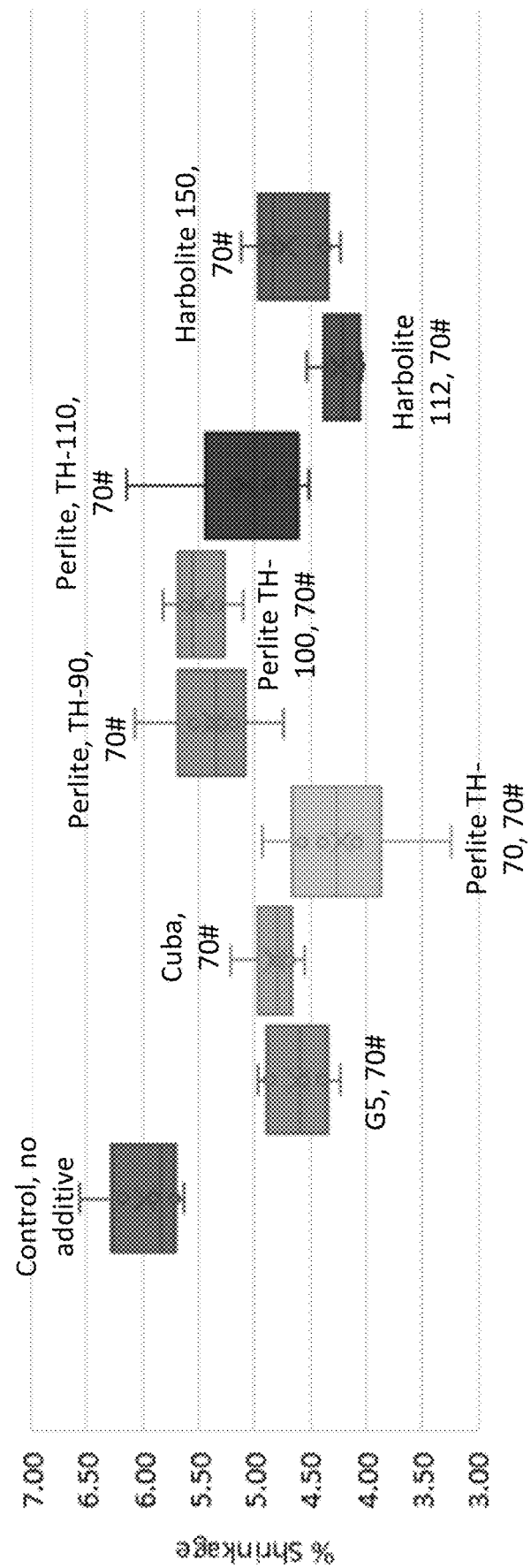
FIG. 7 is a graph showing the % shrinkage of various experimental samples subjected to a high temperature shrinkage test, according to the Examples.
Figure 8:
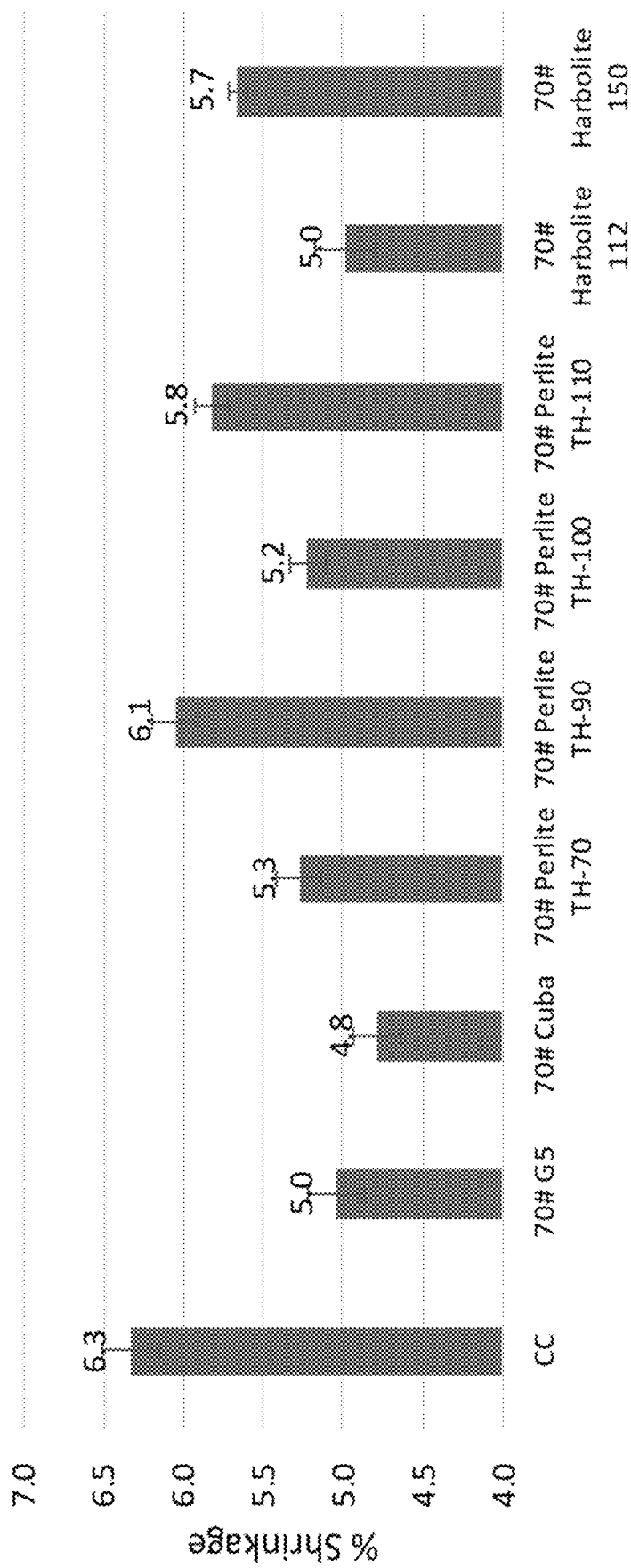
FIG. 8 is a graph showing the % shrinkage of various experimental samples subjected to a high temperature core integrity test, according to the Examples.
Figure 9:
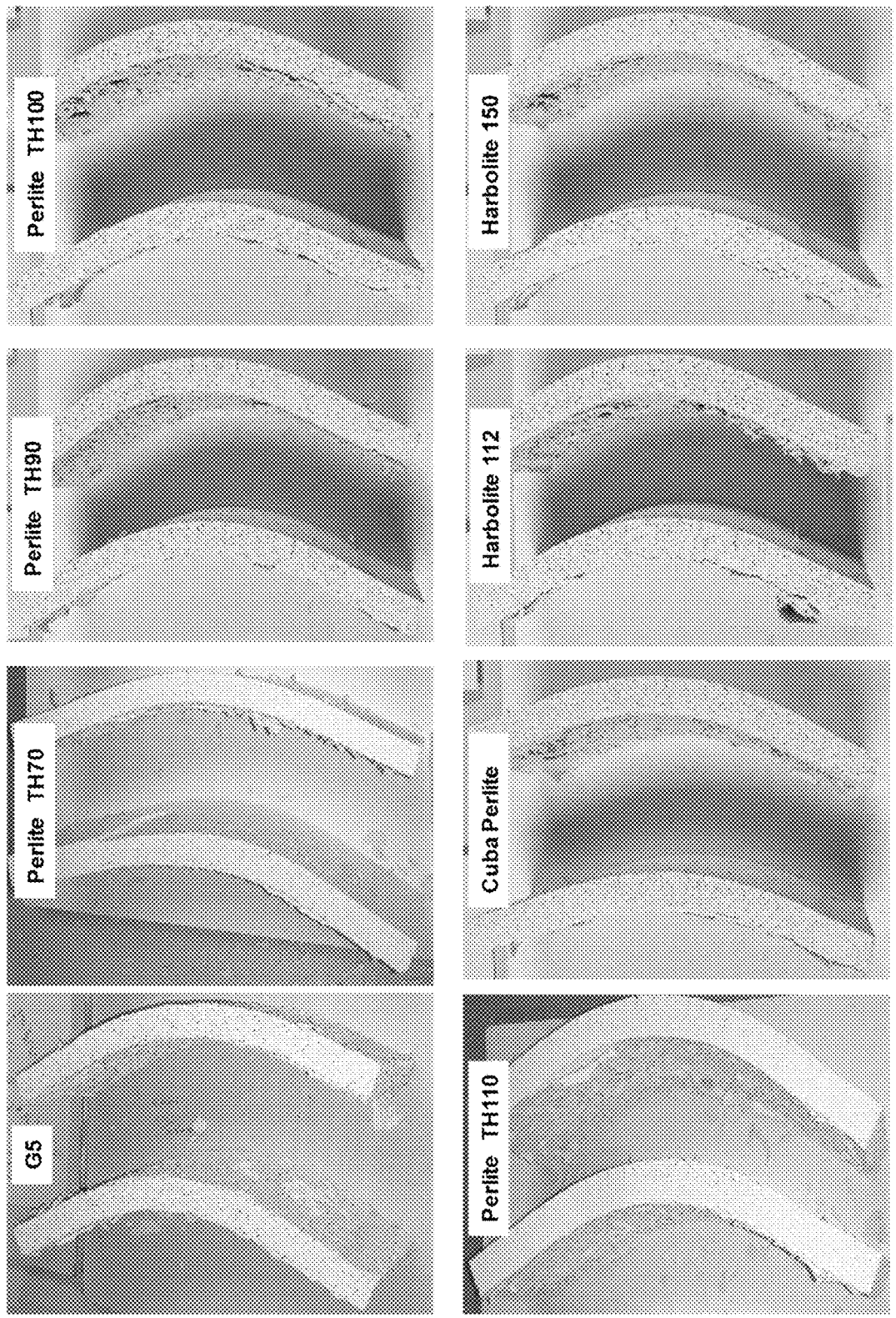
FIG. 9 is a set of photographs showing the cross-sections of various experimental samples subjected to a high temperature core integrity test, according to the Examples.

The results of these tests are summarized in FIGS. 7 and 8, which are graphs showing the High Temperature Shrinkage Tests and High Temperature Core Integrity Test results of samples having various unexpanded perlite ore sources, amounts, and particle sizes. In summary, multiple unexpanded perlite ore options have been identified which perform equal to or better than G5 vermiculite at equal dosages (thermal shrinkage and high temperature core integrity). Moreover, boards made with unexpanded perlite sag less as compared to boards made with vermiculite under fire resistance testing. FIG. 9 shows photographs of cross-sections of the sample board panels subjected to the High Temperature Core Integrity Test.

Figure 10:
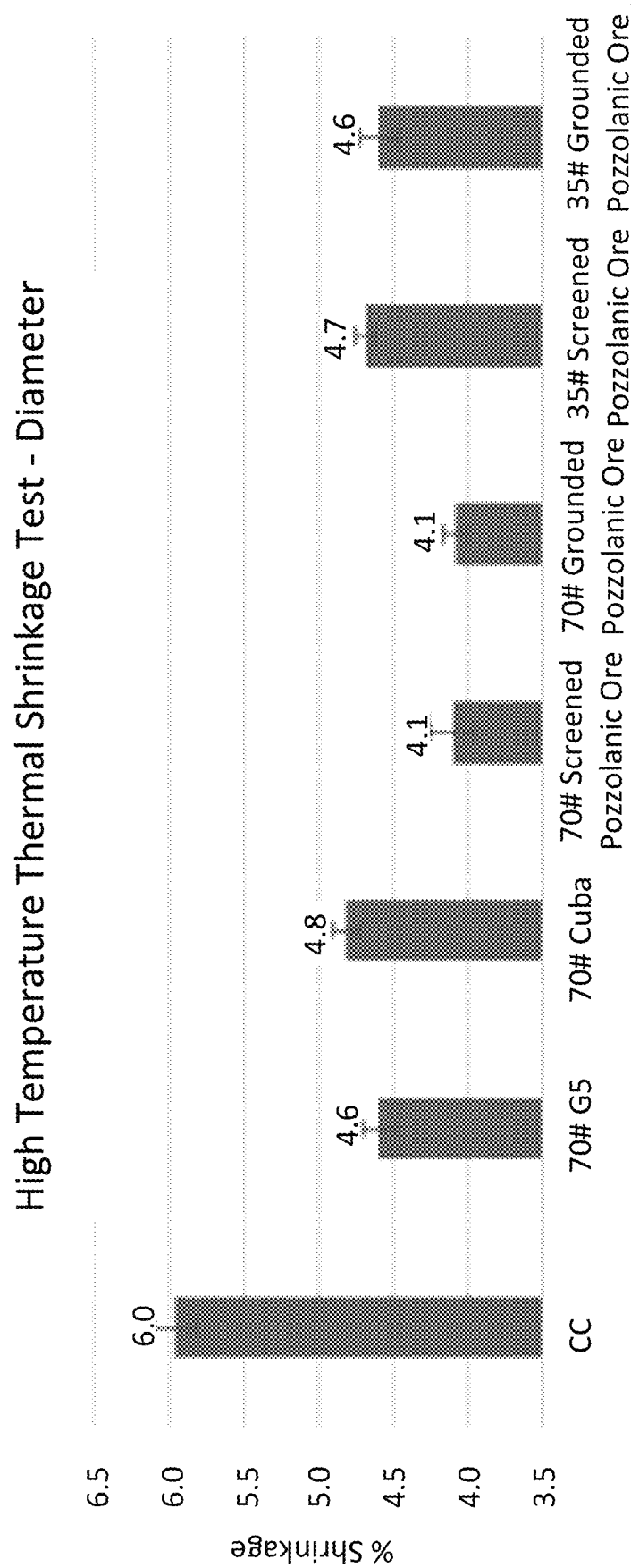
FIG. 10 is a graph showing the % shrinkage of various experimental samples subjected to a high temperature shrinkage test, according to the Examples.
Figure 11:
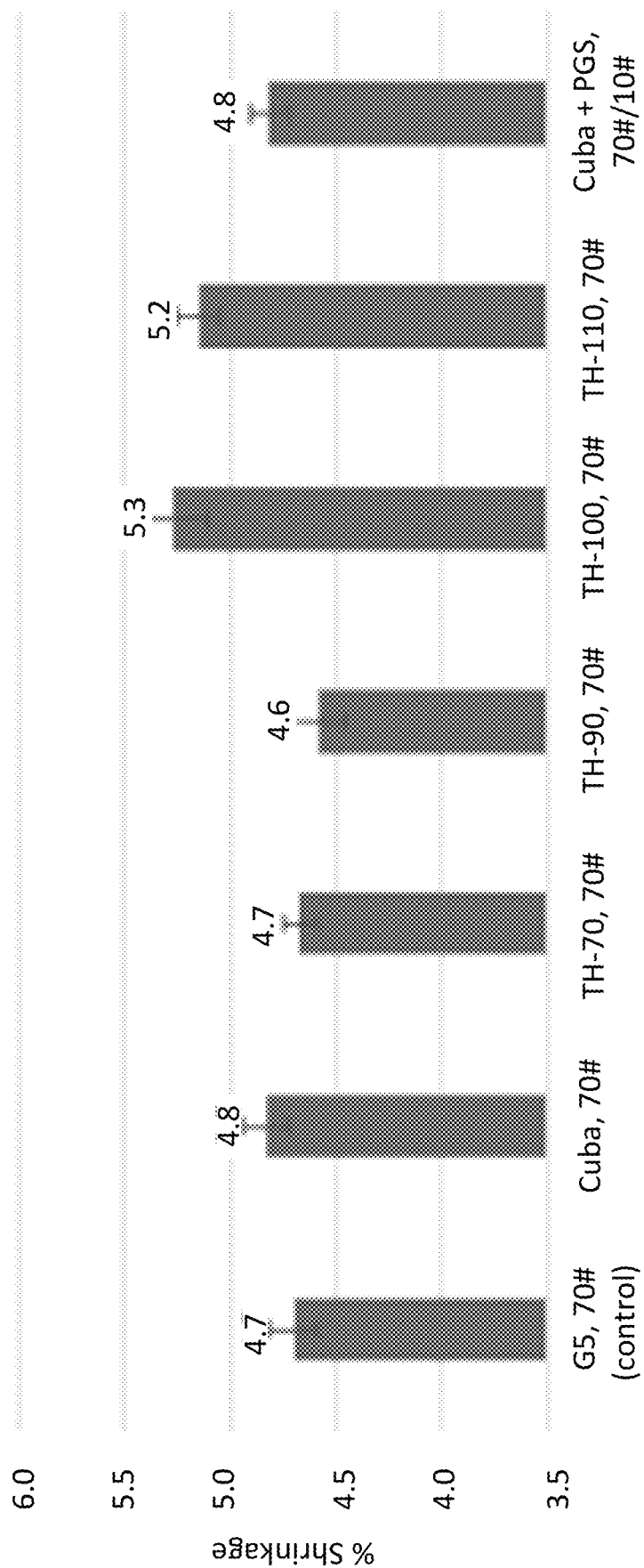
FIG. 11 is a graph showing the % shrinkage of various experimental samples subjected to a high temperature shrinkage test, according to the Examples.
Figure 12:
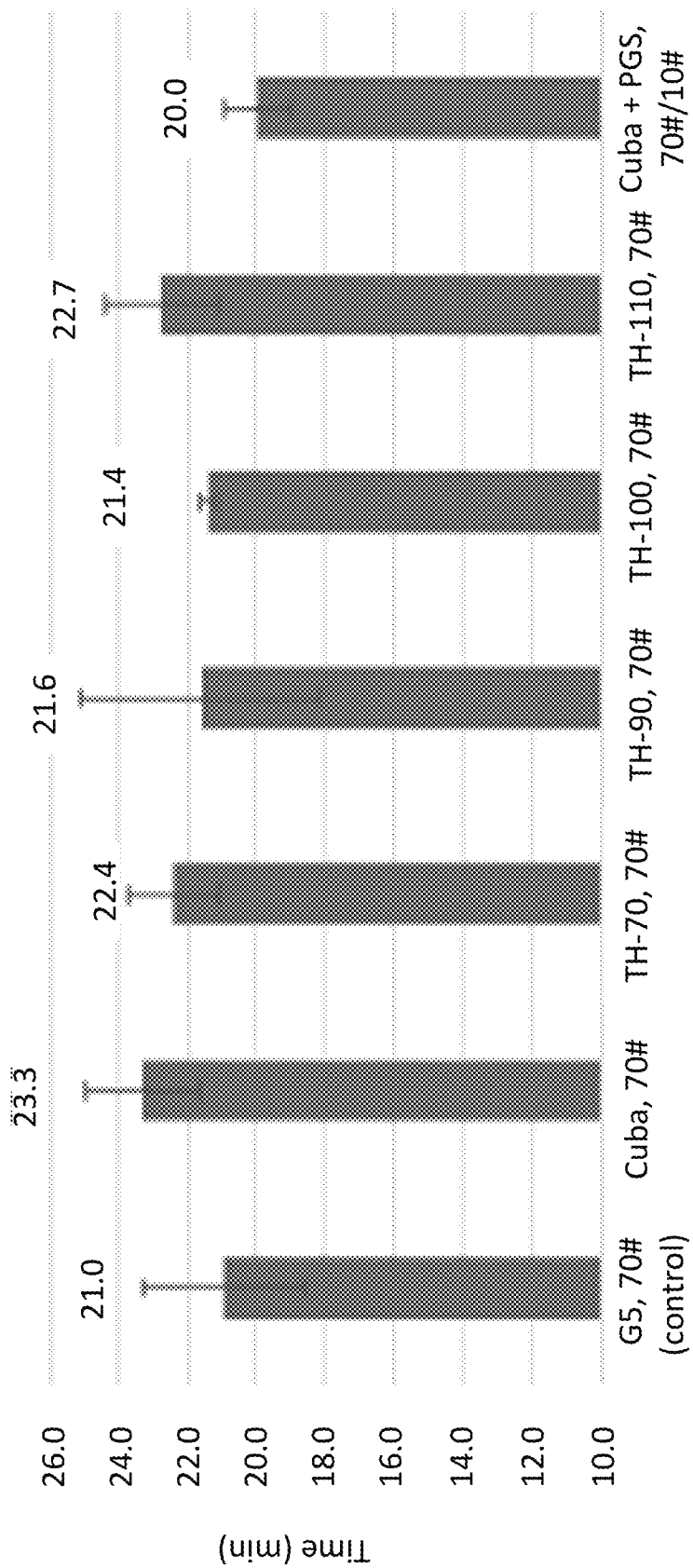
FIG. 12 is a graph showing the time to temperature elevation of various experimental samples subjected to a high temperature thermal transmission test, according to the Examples.
Figure 13:
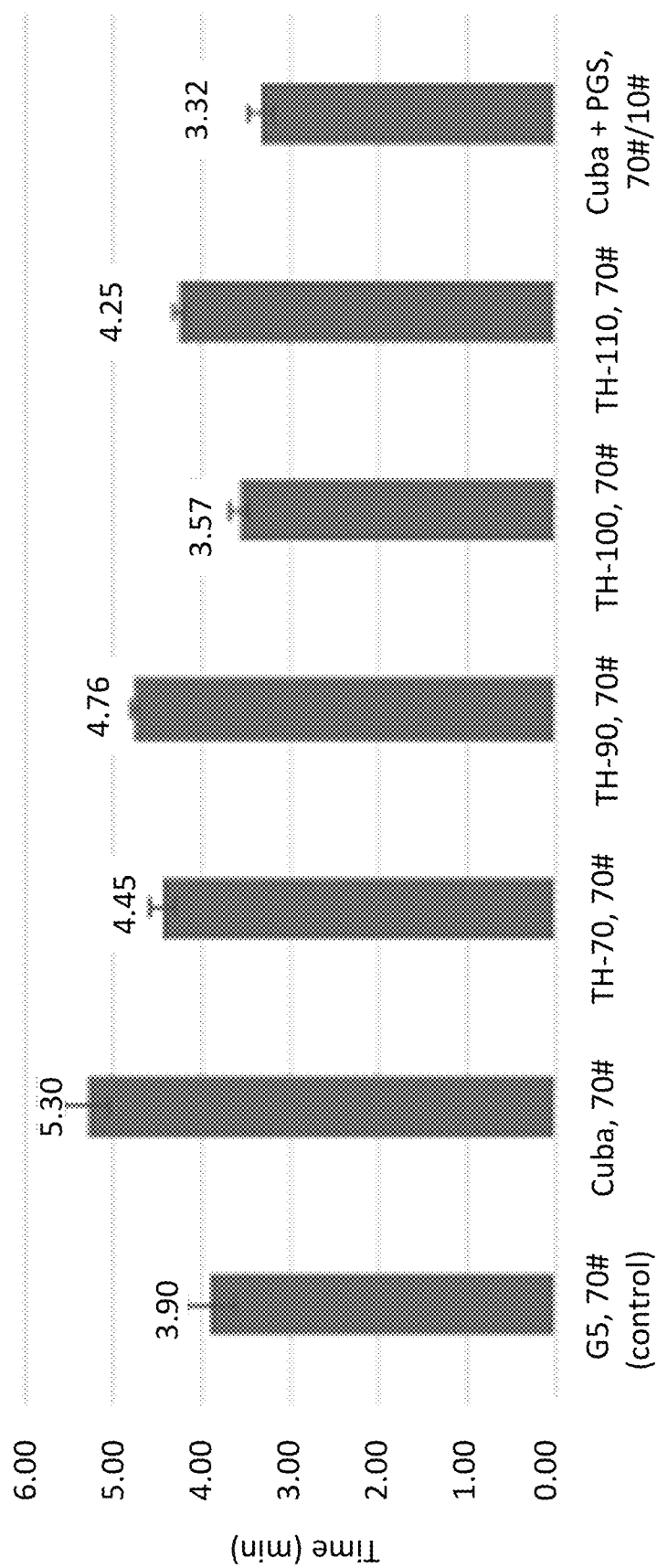
FIG. 13 is a graph showing the time to deflection of various experimental samples subjected to a high temperature core cohesion test, according to the Examples.

Last, a chemical analysis was performed to determine the average compositional makeup of unexpanded perlite ore and unexpanded pozzolanic ore. The results are given in Table 1 below. As can be seen, unexpanded perlite ore and unexpanded pozzolanic ore overlap significantly in composition. Thus, as described herein, the two ores may be used interchangeably. Indeed, a thermal shrinkage test was conducted on various gypsum board samples containing ground unexpanded pozzolanic ore. The results are shown in FIG. 10. As can be seen, the samples containing unexpanded pozzolanic ore displayed comparable or better thermal shrinkage results than comparative samples containing vermiculite.

TABLE 1

Chemical Analysis of Unexpanded Perlite Ore and Unexpanded Pozzolanic Ore
Chemical Analysis: Ignited basis

|  | Perlite ore | Pozzolanic ore |
| --- | --- | --- |
| $SiO_2$ | 70-75% | 73% |
| $Al_2O_3$ | 12-15% | 13% |
| $Na_2O$ | 3-4% | 4% |
| $K_2O$ | 3-5% | 5% |
| $Fe_2O_3$ | 0.5-2% | 1% |
| MgO | 0.2-0.7% | 0.5% |
| CaO | 0.5-1.5% | 2% |
| loss on ignition | 3-5% | 0.5% |

Thus, it has been discovered that gypsum panels, sheathing, roofing, or other construction boards or panels may be formed using unexpanded perlite ore to achieve fire resistance and/or physical properties comparable to similar boards containing vermiculite. These panels may be relatively lightweight while also providing a high fire resistance level, but without the use of, or using a lower relative amount of, vermiculite, as compared to commercially available panels. For example, the boards described herein may display similar or better thermal shrinkage and high temperature core integrity results than comparative boards containing vermiculite instead of the unexpanded perlite ore, such as measured according to ASTM C1795-15: Standard Test Methods for High-Temperature Characterization of Gypsum Boards and Panels. Further, the combination of pregelatinized starch and unexpanded perlite ore was discovered to provide enhanced physical board properties, in addition to the fire resistant properties. For example, the panels containing unexpanded perlite ore were discovered to display less sag than a comparable board made with vermiculite under fire resistance testing.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A gypsum panel, comprising:
   a gypsum core comprising set gypsum and unexpanded perlite ore, wherein the unexpanded perlite ore is present in the gypsum core in an amount greater than any other component, other than the gypsum,
   wherein the gypsum core is free of vermiculite.

2. The gypsum panel of claim 1, wherein the unexpanded perlite ore has an average particle size of about ASTM Sieve No. 400 (0.037 mm) to about ASTM Sieve No. 5 (4 mm).

3. The gypsum panel of claim 1, wherein the gypsum core further comprises starch in an amount effective to bind the gypsum to the unexpanded perlite.

4. The gypsum panel of claim 3, wherein the starch comprises pregelatinized starch or a combination of uncooked and pregelatinized starch.

5. The gypsum panel of claim 3, wherein the starch is present in the gypsum core in an amount of about 1 lb/msf to about 70 lb/msf, for a gypsum panel having a thickness of about ¼ inch to about 1 inch.

6. The gypsum panel of claim 1, wherein the gypsum core further comprises a polymer binder.

7. The gypsum panel of claim 1, wherein the gypsum core further comprises a polyphosphate.

8. The gypsum panel of claim 1, wherein the unexpanded perlite ore is present in the gypsum core in an amount of about 1 lb/msf to about 300 lb/msf, for a gypsum panel having a thickness of about ¼ inch to about 1 inch.

9. The gypsum panel of claim 8, wherein the polyphosphate is sodium trimetaphosphate.

10. A method of making a gypsum panel, comprising:
    forming a first gypsum slurry by combining stucco, water, and unexpanded perlite ore; and
    setting the first gypsum slurry to form at least part of a core of the gypsum panel,
    wherein the unexpanded perlite ore is present in the gypsum core in an amount greater than any other component, other than the gypsum, and
    wherein the first gypsum slurry and the gypsum core are free of vermiculite.

11. The method of claim 10, wherein the unexpanded perlite ore has an average particle size of about ASTM Sieve No. 400 (0.037 mm) to about ASTM Sieve No. 5 (4 mm).

12. The method of claim 10, wherein the first gypsum slurry further comprises starch in an amount effective to bind the gypsum to the unexpanded perlite.

13. The method of claim 12, wherein the starch comprises pregelatinized starch or a combination of uncooked and pregelatinized starch.

14. The method of claim 12, wherein the starch is present in the gypsum core in an amount of about 1 lb/msf to about 70 lb/msf, for a gypsum panel having a thickness of about ¼ inch to about 1 inch.

15. The method of claim 10, wherein the first gypsum slurry further comprises a polymer binder.

16. The method of claim 10, wherein the first gypsum slurry further comprises a polyphosphate.

17. The method of claim 16, wherein the polyphosphate is sodium trimetaphosphate.

18. The method of claim 10, wherein the unexpanded perlite ore is present in the gypsum core in an amount of about 1 lb/msf to about 300 lb/msf, for a gypsum panel having a thickness of about ¼ inch to about 1 inch.

* * * * *